Oct. 13, 1942.　　　　A. WARMISHAM　　　　2,298,993
OPTICAL OBJECTIVE
Filed Dec. 6, 1940
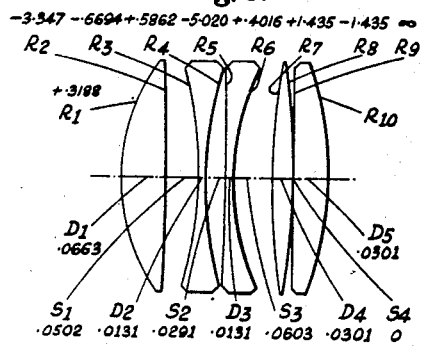
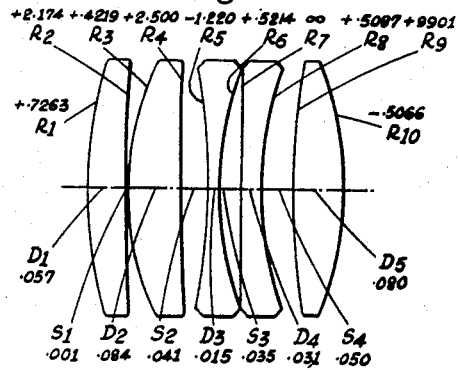
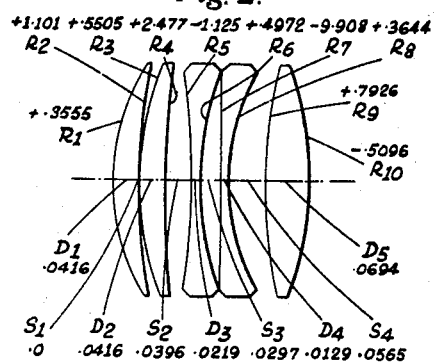
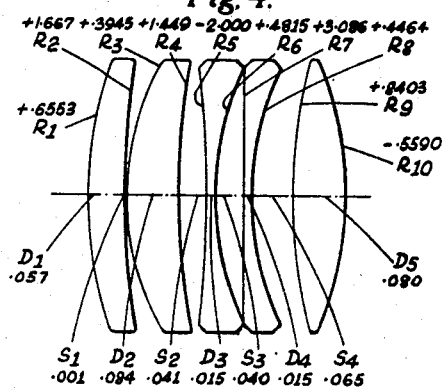
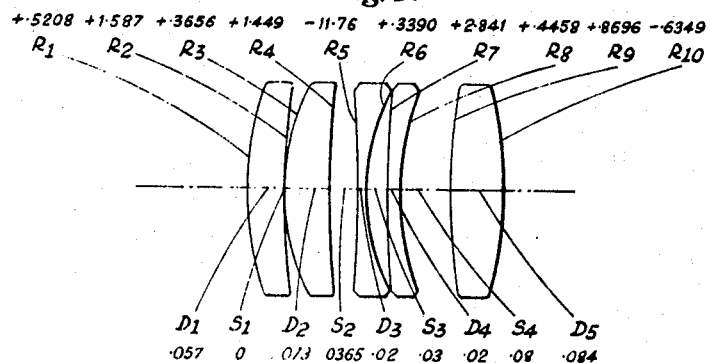
INVENTOR
A. WARMISHAM
BY Blair + Kilcoyne
ATTORNEYS

UNITED STATES PATENT OFFICE 2,298,993

OPTICAL OBJECTIVE

Arthur Warmisham, Leicester, England, assignor to Taylor, Taylor & Hobson Limited, Leicester, England, a company of Great Britain Application December 6, 1940, Serial No. 368,919
In Great Britain December 12, 1939

20 Claims. (Cl. 88—57)

This invention relates to optical objectives for photographic or like purposes, corrected for spherical and chromatic aberrations, coma, astigmatism, field curvature and distortion, and of the kind comprising five simple components separated by air spaces, two of the components being divergent and next to one another, whilst the other three are convergent and are disposed one on one side and two on the other side of the divergent components. It is to be understood that the terms "front" and "rear" as used herein relate respectively to the sides of the objective nearer to and further from the longer conjugate in accordance with the usual convention.

The present invention has for its object to reduce the zonal spherical aberration in such an objective or alternatively to increase the aperture without undue increase of zonal spherical aberration.

In the objective according to the present invention, the air space between the two divergent components conveniently has an axial length less than that of either of the immediately adjacent air spaces, and preferably less than 45% of the sum of those of such air spaces. Conveniently the front divergent component is double-concave and has its shallower side turned towards the front. The numerical sum of the radii of curvature of the front surface of the front divergent component and the rear surface of the rear divergent component preferably exceeds the equivalent focal length of the objective.

It is preferable to employ for all three convergent components glasses having mean refractive indices greater than 1.6. The same glass may be used for these three components, and the two divergent components may also be made of the same glass, so that only two different glasses are required for the objective. In some instances the glasses used for the five components each have a mean refractive index greater than 1.64.

In one arrangement according to the invention the front component and the rear two components are convergent and the second and third components are divergent, whilst in another arrangement the front two components and the rear component are convergent and the third and fourth components divergent. In the latter case, when improved zonal spherical aberration correction is desired, it is preferable for the front surface of the rear divergent component to be flat or slightly concave towards the front, its radius of curvature being not less than four times the equivalent focal length of the objective. For higher aperture objectives, however, such surface is preferably either flat or slightly convex towards the front, its radius of curvature being not less than twice the equivalent focal length of the objective.

The invention may be carried into practice in various ways, but five convenient examples of objective according thereto are illustrated diagrammatically in the accompanying drawing, in which—

Figure 1 shows an example having its second and third components divergent and its first, fourth and fifth components convergent, and Figures 2 to 5 respectively show four examples in which the third and fourth components are divergent and the other three convergent.

Numerical data for these five examples are respectively given in the following five tables, in which $R_1 R_2 \ldots$ represent the radii of curvature of the individual lens surfaces counting from the front (the positive sign indicating that the surface is convex to the front and the negative sign that it is concave thereto), $D_1 D_2 \ldots$ represent the axial thicknesses of the lens elements, and $S_1 S_2 \ldots$ represent the axial air spaces between the components. The tables also give the mean refractive index $n_D$ and the Abbe $\nu$ number for the glass used for each element.

Example I

Equivalent focal length 1.000. Relative aperture F/3.5

| Radius | Thickness or separation | Refractive index $n_D$ | Abbe $\nu$ number |
|---|---|---|---|
| $R_1=+.3188$ | $D_1=.0663$ | 1.613 | 59.4 |
| $R_2=-3.347$ | $S_1=.0502$ | | |
| $R_3=-.6694$ | $D_2=.0131$ | 1.579 | 40.4 |
| $R_4=+.5862$ | $S_2=.0291$ | | |
| $R_5=-5.020$ | $D_3=.0131$ | 1.579 | 40.4 |
| $R_6=+.4016$ | $S_3=.0603$ | | |
| $R_7=+1.435$ | $D_4=.0301$ | 1.613 | 59.4 |
| $R_8=-1.435$ | $S_4=0$ | | |
| $R_9=\infty$ | $D_5=.0301$ | 1.613 | 59.4 |
| $R_{10}=-.5466$ | | | |

It will be noticed that in this example $S_2$ is less than $S_1$ and $S_3$ and is less than a third of the sum of $S_1$ and $S_3$, whilst $S_4$ is zero, the fourth and fifth components touching one another at the axis. Also $R_3$ is numerically greater than $R_4$ and the numerical sum of $R_3$ and $R_6$ is greater than 1. Two glasses only are used, one for the three convergent components having a mean refractive index 1.613 and the other for the two divergent components with a lower index.

Example II

Equivalent focal length 1.000.  Relative aperture F/3.5

| Radius | Thickness or separation | Refractive index $n_D$ | Abbe $\nu$ number |
|---|---|---|---|
| $R_1=+\ .3555$ | | | |
| | $D_1=\ .0416$ | 1.613 | 59.4 |
| $R_2=+1.101$ | | | |
| | $S_1=0$ | | |
| $R_3=+\ .5505$ | | | |
| | $D_2=\ .0416$ | 1.613 | 59.4 |
| $R_4=+2.477$ | | | |
| | $S_2=\ .0396$ | | |
| $R_5=-1.125$ | | | |
| | $D_3=\ .0129$ | 1.579 | 40.4 |
| $R_6=+\ .4972$ | | | |
| | $S_3=\ .0297$ | | |
| $R_7=-9.908$ | | | |
| | $D_4=\ .0129$ | 1.579 | 40.4 |
| $R_8=+\ .3644$ | | | |
| | $S_4=\ .0565$ | | |
| $R_9=+\ .7926$ | | | |
| | $D_5=\ .0694$ | 1.613 | 59.4 |
| $R_{10}=-\ .5096$ | | | |

Example III

Equivalent focal length 1.000.  Relative aperture F/2.5

| Radius | Thickness or separation | Refractive index $n_D$ | Abbe $\nu$ number |
|---|---|---|---|
| $R_1=+\ .7262$ | | | |
| | $D_1=.057$ | 1.613 | 59.3 |
| $R_2=+2.174$ | | | |
| | $S_1=.001$ | | |
| $R_3=+\ .4219$ | | | |
| | $D_2=.084$ | 1.613 | 59.3 |
| $R_4=+2.500$ | | | |
| | $S_2=.041$ | | |
| $R_5=-1.220$ | | | |
| | $D_3=.015$ | 1.621 | 36.2 |
| $R_6=+\ .5214$ | | | |
| | $S_3=.035$ | | |
| $R_7=\infty$ | | | |
| | $D_4=.031$ | 1.621 | 36.2 |
| $R_8=+\ .5087$ | | | |
| | $S_4=.050$ | | |
| $R_9=+\ .9901$ | | | |
| | $D_5=.080$ | 1.644 | 48.3 |
| $R_{10}=-\ .5066$ | | | |

Example IV

Equivalent focal length 1.000.  Relative aperture F/2.5

| Radius | Thickness or separation | Refractive index $n_D$ | Abbe $\nu$ number |
|---|---|---|---|
| $R_1=+\ .6553$ | | | |
| | $D_1=.057$ | 1.644 | 48.3 |
| $R_2=+1.667$ | | | |
| | $S_1=.001$ | | |
| $R_3=+\ .3945$ | | | |
| | $D_2=.084$ | 1.613 | 59.3 |
| $R_4=+1.449$ | | | |
| | $S_2=.041$ | | |
| $R_5=-2.000$ | | | |
| | $D_3=.015$ | 1.652 | 33.5 |
| $R_6=+\ .4815$ | | | |
| | $S_3=.040$ | | |
| $R_7=+3.086$ | | | |
| | $D_4=.015$ | 1.652 | 33.5 |
| $R_8=+\ .4464$ | | | |
| | $S_4=.065$ | | |
| $R_9=+\ .8403$ | | | |
| | $D_5=.080$ | 1.644 | 48.3 |
| $R_{10}=-\ .5590$ | | | |

Example V

Equivalent focal length 1.000.  Relative aperture F/2.5

| Radius | Thickness or separation | Refractive index $n_D$ | Abbe $\nu$ number |
|---|---|---|---|
| $R_1=+\ .5208$ | | | |
| | $D_1=.057$ | 1.644 | 48.3 |
| $R_2=+\ 1.587$ | | | |
| | $S_1=0$ | | |
| $R_3=+\ .3656$ | | | |
| | $D_2=.073$ | 1.644 | 48.3 |
| $R_4=+\ 1.449$ | | | |
| | $S_2=\ .0365$ | | |
| $R_5=-11.76$ | | | |
| | $D_3=.02$ | 1.697 | 30.5 |
| $R_6=+\ .3390$ | | | |
| | $S_3=.03$ | | |
| $R_7=+\ 2.841$ | | | |
| | $D_4=.02$ | 1.652 | 33.5 |
| $R_8=+\ .4458$ | | | |
| | $S_4=.08$ | | |
| $R_9=+\ .8696$ | | | |
| | $D_5=.084$ | 1.644 | 48.3 |
| $R_{10}=-\ .6349$ | | | |

It will be noticed in these last four examples that $S_3$ is less than $S_2$ and $S_4$ and less than 45% of the sum of $S_2$ and $S_4$, and that $R_5$ is negative and is numerically greater than $R_6$, whilst the numerical sum of $R_5$ and $R_8$ is considerably greater than the equivalent focal length. In Example II $R_7$ is slightly concave to the front, and in Example III $R_7$ is flat. In Examples IV and V the fourth element is slightly meniscus shaped, with surface $R_7$ convex to the front. In Examples II and V the same glass is used for all three convergent components, and in Example V all five components are made of glasses having mean refractive index greater than 1.64. With such an arrangement it is possible to obtain good spherical aberration correction up to an aperture F/2.5 with useful definition over a field having a semi-angle of 25 degrees.

What I claim as my invention and desire to secure by Letters Patent is:

1. An optical objective for photographic or like purposes, corrected for spherical and chromatic aberrations, coma, astigmatism, field curvature and distortion, comprising five axially aligned components separated by air spaces and each consisting of a simple element, two of the components being divergent and next to one another whilst the other three are convergent and are disposed one on one side and two on the other side of the pair of divergent components, wherein the air space between the two divergent components has an axial length less than that of either of the immediately adjacent air spaces and less than 45 per cent of the sum of those of such adjacent air spaces, the radius of curvature of the front surface of the rear divergent component being greater than twice the equivalent focal length of the objective, while the radius of curvature of the rear surface of the convergent front component is not less than twice that of the front surface thereof.

2. An optical objective as claimed in claim 1, in which the front divergent component is asymmetrical and double concave and has its shallower side turned towards the front.

3. An optical objective as claimed in claim 1, in which the numerical sum of the radii of curvature of the front surface of the front divergent component and of the rear surface of the rear divergent component exceeds the equivalent focal length of the objective.

4. An optical objective as claimed in claim 1, in which the glasses used for the three convergent components each have a mean refractive index greater than 1.6.

5. An optical objective as claimed in claim 1, in which the same glass is used for all three convergent components.

6. An optical objective as claimed in claim 1, in which the same glass is used for all three convergent components, whilst another glass is used for the two divergent components.

7. An optical objective for photographic or like purposes, corrected for spherical and chromatic aberrations, coma, astigmatism, field curvature and distortion, comprising five axially aligned components separated by air spaces and each consisting of a simple element, the front component and the rear two components being convergent and the second and third components divergent, wherein the numerical sum of the radii of curvature of the front surface of the second component and of the rear surface of the third component exceeds the equivalent focal length of the objective, the glasses used for the three convergent components each having a mean refractive index greater than 1.6, the axial length of the air space between the two divergent components being less than that of either of the immediately adjacent air spaces and less than 45 per cent of the sum of those of such air spaces.

8. An optical objective for photographic or like purposes, corrected for spherical and chromatic aberrations, coma, astigmatism, field curvature and distortion, comprising five axially aligned components separated by air spaces and each consisting of a simple element, the front two components and the rear component being convergent and the third and fourth components divergent, wherein the axial length of the air space between the two divergent components is less than that of either of the two immediately adjacent air spaces and is less than 45 per cent of the sum of those of such adjacent air spaces, the radius of curvature of the front surface of the fourth component being greater than twice the equivalent focal length of the objective, while the surfaces of the convergent front component are both convex to the front and have radii of curvature whose ratio lies between 2.5 and 4.0 times the equivalent focal length of the objective.

9. An optical objective as claimed in claim 8, in which the numerical sum of the radii of curvature of the front surface of the third component and of the rear surface of the fourth component is greater than the equivalent focal length of the objective, the glasses used for the five components each having a mean refractive index greater than 1.6.

10. An optical objective for photographic or like purposes, corrected for spherical and chromatic aberrations, coma, astigmatism, field curvature and distortion, comprising five axially aligned components separated by air spaces and each consisting of a simple element, the front two components and the rear component being convergent whilst the third and fourth components are divergent, wherein the third component is double-concave with its shallower side turned towards the front, and the front surface of the fourth component has a radius of curvature not less than four times the equivalent focal length of the objective, the axial length of the air space between the third and fourth components being less than that of either of the two immediately adjacent air spaces.

11. An optical objective for photographic or like purposes, corrected for spherical and chromatic aberrations, coma, astigmatism, field curvature and distortion, comprising five axially aligned components separated by air spaces and each consisting of a simple element, the front two components and the rear component being convergent whilst the third and fourth components are divergent, wherein the axial length of the air space between the two divergent components is less than 45 per cent of the sum of those of the two immediately adjacent air spaces, and the radius of curvature of the front surface of the fourth component is not less than four times the equivalent focal length of the objective, the five components each being made of glass having mean refractive index greater than 1.6.

12. An optical objective for photographic or like purposes, corrected for spherical and chromatic aberrations, coma, astigmatism, field curvature and distortion, comprising five axially aligned components separated by air spaces and each consisting of a simple element, the front two components and the rear component being convergent whilst the third and fourth components are divergent, wherein the axial length of the air space between the two divergent components is less than that of either of the two immediately adjacent air spaces, whilst the front surface of the fourth component is convex towards the front and has a radius of curvature not less than twice the equivalent focal length of the objective.

13. An optical objective as claimed in claim 12, in which the glasses used for the five components each have a mean refractive index greater than 1.64.

14. An optical objective for photographic or like purposes, corrected for spherical and chromatic aberrations, coma, astigmatism, field curvature and distortion, comprising five axially aligned components separated by air spaces and each consisting of a simple element, the front two components and the rear component being convergent and all made of the same glass having refractive index greater than 1.64 whilst the third and fourth components are divergent, wherein the front surface of the fourth component is convex towards the front and has a radius of curvature not less than twice the equivalent focal length of the objective, and the numerical sum of the radii of curvature of the front surface of the third component and of the rear surface of the fourth component exceeds the equivalent focal length of the objective.

15. An optical objective having numerical data as set forth in the following table:

Equivalent focal length 1.000. Relative aperture F/3.5

| Radius | Thickness or separation | Refractive index $n_D$ | Abbe $\nu$ number |
|---|---|---|---|
| $R_1 = +.3188$ | $D_1 = .0663$ | 1.613 | 59.4 |
| $R_2 = -3.347$ | $S_1 = .0502$ | | |
| $R_3 = -.6694$ | $D_2 = .0131$ | 1.579 | 40.4 |
| $R_4 = +.5862$ | $S_2 = .0291$ | | |
| $R_5 = -5.020$ | $D_3 = .0131$ | 1.579 | 40.4 |
| $R_6 = +.4016$ | $S_3 = .0603$ | | |
| $R_7 = +1.435$ | $D_4 = .0301$ | 1.613 | 59.4 |
| $R_8 = -1.435$ | $S_4 = 0$ | | |
| $R_9 = \infty$ | $D_5 = .0301$ | 1.613 | 59.4 |
| $R_{10} = -.5466$ | | | |

Where $R_1R_2$ ... represent the radii of curvature of the individual surfaces, $D_1D_2$ ... represent the axial thicknesses of the various elements, and $S_1S_2$ ... represent the axial air spaces between the components.

16. An optical objective having numerical data as set forth in the following table:

Equivalent focal length 1.000.  Relative aperture F/2.5

| Radius | Thickness or separation | Refractive index $n_D$ | Abbe $\nu$ number |
|---|---|---|---|
| $R_1=+ .7262$ | | | |
| | $D_1= .057$ | 1.613 | 59.3 |
| $R_2=+2.174$ | | | |
| | $S_1= .001$ | | |
| $R_3=+ .4219$ | | | |
| | $D_2= .084$ | 1.613 | 59.3 |
| $R_4=+2.500$ | | | |
| | $S_2= .041$ | | |
| $R_5=-1.220$ | | | |
| | $D_3= .015$ | 1.621 | 36.2 |
| $R_6=+ .5214$ | | | |
| | $S_3= .035$ | | |
| $R_7=\infty$ | | | |
| | $D_4= .031$ | 1.621 | 36.2 |
| $R_8=+ .5087$ | | | |
| | $S_4= .050$ | | |
| $R_9=+ .9901$ | | | |
| | $D_5= .080$ | 1.644 | 48.3 |
| $R_{10}=- .5066$ | | | |

Where $R_1R_2$ ... represent the radii of curvature of the individual surfaces, $D_1D_2$ ... represent the axial thicknesses of the various elements, and $S_1S_2$ ... represent the axial air spaces between the components.

17. An optical objective having numerical data as set forth in the following table:

Equivalent focal length 1.000.  Relative aperture F/2.5

| Radius | Thickness or separation | Refractive index $n_D$ | Abbe $\nu$ number |
|---|---|---|---|
| $R_1=+ .5208$ | | | |
| | $D_1= .057$ | 1.644 | 48.3 |
| $R_2=+ 1.587$ | | | |
| | $S_1=0$ | | |
| $R_3=+ .3656$ | | | |
| | $D_2= .073$ | 1.644 | 48.3 |
| $R_4=+ 1.449$ | | | |
| | $S_2= .0365$ | | |
| $R_5=-11.76$ | | | |
| | $D_3= .02$ | 1.697 | 30.5 |
| $R_6=+ .3390$ | | | |
| | $S_3= .03$ | | |
| $R_7=+ 2.841$ | | | |
| | $D_4= .02$ | 1.652 | 33.5 |
| $R_8=+ .4458$ | | | |
| | $S_4= .08$ | | |
| $R_9=+ .8696$ | | | |
| | $D_5= .084$ | 1.644 | 48.3 |
| $R_{10}=- .6349$ | | | |

Where $R_1R_2$ ... represent the radii of curvature of the individual surfaces, $D_1D_2$ ... represent the axial thicknesses of the various elements, and $S_1S_2$ ... represent the axial air spaces between the components.

18. An optical objective for photographic or like purposes, corrected for spherical and chromatic aberrations, coma, astigmatism, field curvature and distortion, comprising five axially aligned components separated by air spaces and each consisting of a simple element, the front two components being convergent meniscus components with their surfaces convex to the front, the third component being an asymmetrical biconcave divergent component with its shallower face turned towards the front, the fourth component being an asymmetrical divergent component whose front surface has a radius of curvature greater than twice the equivalent focal length of the objective, and the rear component being a biconcave convergent component.

19. An optical objective as claimed in claim 18, in which the axial length of the air space between the two divergent components is less than that of either of the two immediately adjacent air spaces.

20. An optical objective as claimed in claim 18, in which the fourth component is planoconcave, the numerical sum of the radii of curvature of the rear surface thereof and of the front surface of the third component being greater than the equivalent focal length of the objective.

ARTHUR WARMISHAM.